(12) United States Patent
Steinman

(10) Patent No.: US 7,048,243 B1
(45) Date of Patent: May 23, 2006

(54) TRIVET

(75) Inventor: Lee E. Steinman, Pigeon, MI (US)

(73) Assignee: GRM Corporation, Pigeon, MI (US)

( * ) Notice: Subject to any disclaimer, the term of this patent is extended or adjusted under 35 U.S.C. 154(b) by 0 days.

(21) Appl. No.: 10/629,455

(22) Filed: Jul. 29, 2003

(51) Int. Cl.
 *A47B 91/00* (2006.01)
(52) U.S. Cl. ............................ 248/346.01; 248/346.5; 248/152
(58) Field of Classification Search ........... 248/346.01, 248/346.02, 346.03, 346.04, 346.05, 346.06, 248/346.07, 903, 152, 176.1, 176.2, 174, 248/346.5; D7/388, 396.2, 545, 698; D34/38; 269/54.5, 13, 900; 211/126; 99/446; 241/273.2; 428/33; 273/292
 See application file for complete search history.

(56) References Cited

U.S. PATENT DOCUMENTS

| 494,825 | A | 4/1893 | Spicer |
| 539,698 | A | 5/1895 | Milligan |
| 586,139 | A | 7/1897 | Moss |
| 1,083,573 | A | 1/1914 | Wehrwein |
| D071,092 | S | 9/1926 | Wentorf |
| 2,032,292 | A | 2/1936 | Masse |
| D123,472 | S | 11/1940 | Caldwell |
| 2,580,843 | A | 1/1952 | Sam |
| 3,591,216 | A | 7/1971 | Onufer |
| 4,550,894 | A | 11/1985 | Barlics |
| D337,483 | S | 7/1993 | Newton et al. |
| 5,386,978 | A * | 2/1995 | Ladwig .................. 269/289 R |
| D445,638 | S | 7/2001 | Bodum |
| D445,639 | S | 7/2001 | Bodum |
| 6,257,540 | B1 | 7/2001 | Kresch |
| D446,075 | S | 8/2001 | Bodum |
| 6,371,470 | B1 * | 4/2002 | Ward ...................... 269/289 R |
| 6,726,190 | B1 * | 4/2004 | Malpass et al. ............. 267/145 |

* cited by examiner

*Primary Examiner*—Gwendolyn Baxter
(74) *Attorney, Agent, or Firm*—John K. McCulloch

(57) ABSTRACT

A trivet comprises a pad of thermal insulating material having opposite surfaces from each of which a plurality of uniform height projections extends so as to provide a space between a container supported at one side of the body and a space between the body and the surface of an article on which the body is supported. The body has at least one opening therein for the removable accommodation of a retainer having a stem and an enlargement at one end thereof which may be deformed to enable it to pass through the opening in the body. The opposite end of the stem is joined to a coupling strap terminating at its opposite end in a second, similar retainer thereby enabling the coupling strap to join two similar bodies to one another.

14 Claims, 2 Drawing Sheets

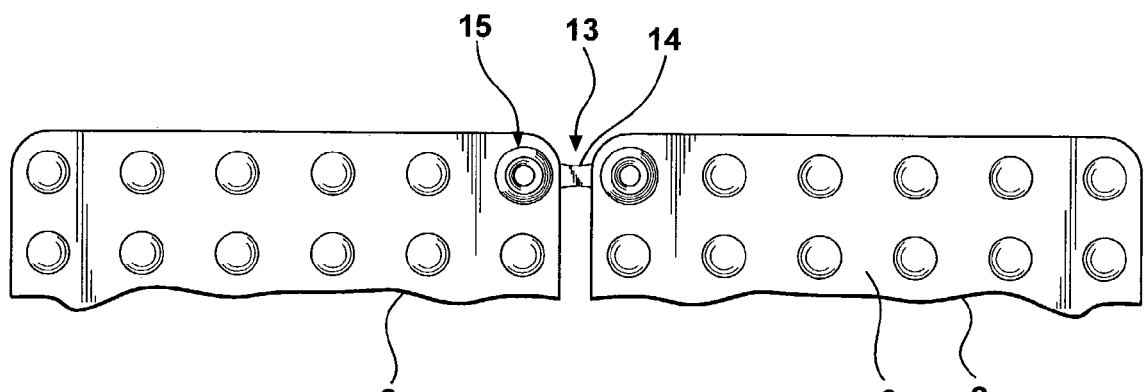
FIG - 5
FIG - 6
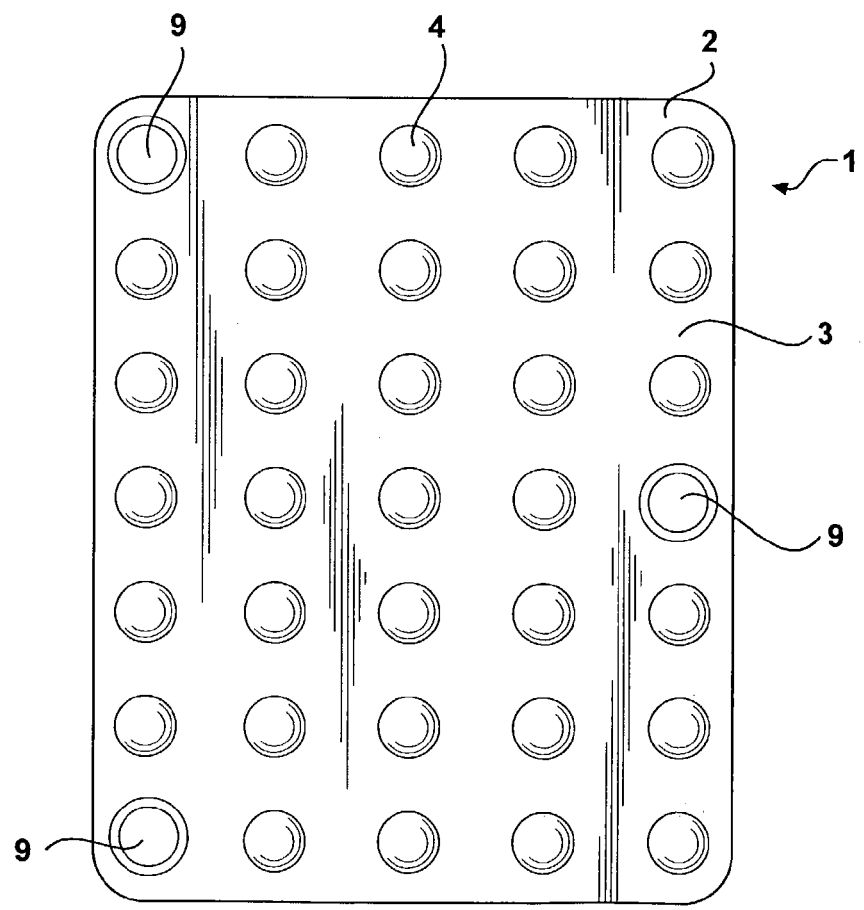

TRIVET

This invention relates to a trivet formed of one or more pads of thermal insulating, resilient material which may be used individually or in conjunction with one or more similar pads.

BACKGROUND OF THE INVENTION

A trivet formed of material relatively impervious to temperature extremes is in common use for supporting a hot or cold serving dish or other container on a table or other support for the purpose of protecting such table or other support from damage due to the temperature of the container. Such trivets commonly are formed of metal or thermal insulating materials which either absorb or dissipate heat, or both. Some trivets simply lie upon the table or other support in face-to-face engagement therewith, whereas others have a container supporting surface elevated from the surface of the support by legs or projections. Known trivets are formed to a selected size and are used individually or in groups as may be necessary to provide a protective layer of material between a container and the surface on which it is supported.

Some trivets are formed of multiple sections, usually of metal, which enable the adjustment of such sections toward and away from one another so as to vary the size of the container which may be supported on such trivets. The use of such telescoping extensions involves relatively high costs and, usually, an increase in weight of trivets employing them.

Some trivets of conventional construction are susceptible to being scorched or otherwise damaged by use with very hot containers. Others may be rendered unusable by absorbing liquids which may overflow a container supported on such a trivet.

An object of this invention is to provide a trivet construction which overcomes or minimizes greatly the disadvantageous characteristics of conventional trivets.

SUMMARY OF THE INVENTION

A trivet constructed in accordance with the invention comprises a body or pad of thermal insulating material having substantial strength and being impervious to spills of the contents of containers normally associated with the use of trivets. The pad has substantially hemispherical projections extending from one or both of the surfaces of the pad so as to space the surface or surfaces of the pad from the container supported thereon or the support on which the trivet is placed. The spacing promotes the dissipation of heat.

The trivet-forming pad also has at least one opening therethrough adjacent an edge of the pad and through which a coupling member may pass for removable retention within the opening. The coupling is joined to a strap which also is joined to another, corresponding coupling. Each coupling is adapted to be inserted through an opening in the pad and be removably retained therein. Each opening is surmounted by an upstanding flange which forms a rigidifying grommet.

The coupling enables the trivet pads to be used singly or in combination with one or more others. When more than one trivet is used, the coupling prevents inadvertent separation of one from another and maintains them in selected positions of adjustment.

The material from which the trivet and coupling are formed is resiliently pliable, thermally insulating, durable in use, and impervious to the absorption of moisture. The pad is readily cleanable, long lived, and relatively insensitive to temperature extremes.

The trivet has projections extending from at least one and preferably both of the opposite surfaces of the pad to provide air spaces between the main body of the trivet and the surface of the container supported on the trivet or the surface of the support on which the trivet is mounted.

THE DRAWINGS

A trivet constructed in accordance with the preferred embodiment of the invention is illustrated in the accompanying drawings wherein:

FIG. 5 is a fragmentary plan view illustrating two trivets coupled to one another; and FIG. 6 is a view similar to FIG. 1, but illustrating a trivet having more than one coupling opening therein.

DETAILED DESCRIPTION

Figure 1:
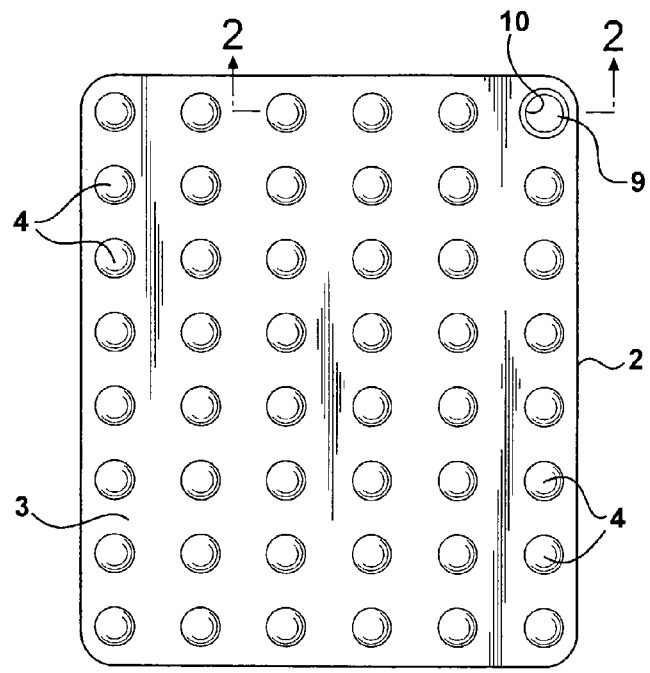
FIG. 1 is a plan view of one surface of the trivet, the opposite surface preferably being the same.
Figure 2:
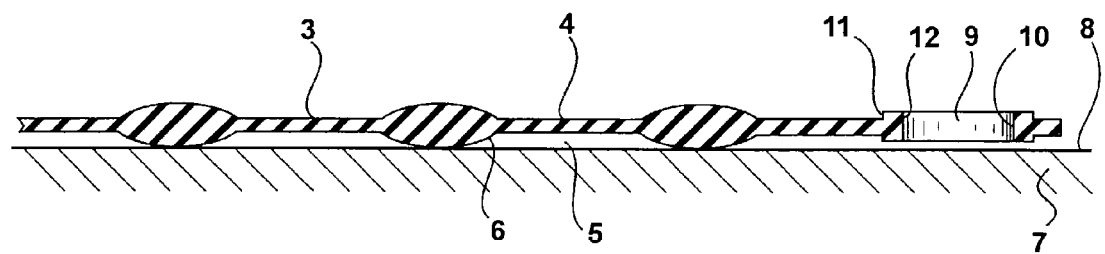
FIG. 2 is a sectional view on an enlarged scale and taken on the line 2—2 of FIG. 1.
Figure 3:
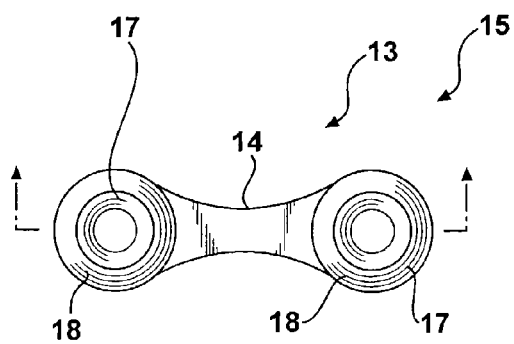
FIG. 3 is a top plan view of a coupling.
Figure 4:
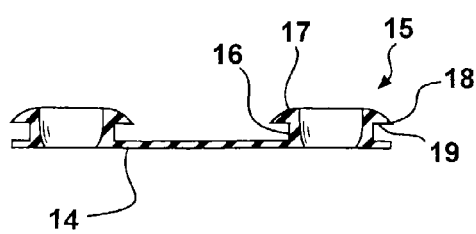
FIG. 4 is a transverse sectional view taken on the line 4—4 of FIG. 3.

A presently preferred form of trivet is designated by the reference character 1 and comprises a rectangular body or pad 2 formed of material such as silicone rubber which has thermal insulating properties, is resiliently pliable, and is relatively impervious to the absorption of moisture. The body has one relatively flat surface 3 from which extend a plurality spaced apart, substantially hemispherical projections 4. All of the projections extend in the same direction from the surface 3 and are of substantially uniform height.

The body 2 has an opposite surface 5 from which similar projections 6 extend. The projections 6 correspond in height to that of the projections 4, so it does not matter which surface is face up or face down. Whenever the body 2 is supported on a base 7 having a flat surface 8, the projections 6 provide an air space between the surfaces 5 and 8 through which air may circulate to dissipate heat. Similarly, the projections 4 provide support for the bottom of a container (not shown) for hot or cold materials and a similar air space is provided between the bottom of the container and the surface 3.

Adjacent one corner of the body 1 is a cylindrical opening 9 having a smooth wall 10. Encircling the opening 9 and on each side of the body 2 is an upstanding reinforcing flange or grommet 11 having a bore 12 the surface of which is smooth and extends in prolongation of the wall 10. The cross sectional area of the opening 9 is coextensive with that of the bore 12.

A coupling for connecting two or more similar trivet body pads 2 to one another is indicated generally by the reference character 13 and comprises a strap 14 formed of resiliently pliable material like that from which the body 2 is formed. However, the thickness of the strap 14 is considerably less than that of the body 2. One end of the strap 14 is joined to a retainer 15 comprising an upstanding, hollow stem 16 terminating at one end in an enlargement 17 having a beveled external surface 18. The enlargement forms a shoulder 19. The diameter of the stem 16 corresponds substantially to that of the opening 9.

At the opposite end of the strap 14 is a second retainer 15 corresponding in all respects to that described above.

The strap 14 is formed integrally with the retainers 15 and extends beyond and encircles the periphery of the associated stem 16. There thus is formed at opposite ends of each stem an enlargement which extends beyond the confines of the opening 9 and inhibits removal of the stem from the opening 9 once the stem has been inserted into such opening. However, because of the resiliently pliable nature of the material from which the coupling 13 is formed, the enlargement 17 may be deformed to permit insertion of the retainer into the opening 9.

The height of the stem 16 is such that the adjacent portion of the strap 14 and the shoulder 19 will engage opposite sides of a pad, but because of the smooth surfaces of the confronting parts of the stem, the opening, and the flanges 11 the stem is freely rotatable within the opening.

The length of the strap 14 is such as to enable it to span the distance from one edge of one body 2 to an adjacent edge of a second body, thereby coupling two bodies to one another.

FIG. 5 illustrates two identical bodies 2 arranged side by side and coupled to one another by the coupling means 13. In this arrangement two of the longer sides of the bodies 2 are adjacent one another. This arrangement may be used in those instances in which the area of a single body is inadequate to support an article.

The arrangement shown in FIG. 5 can be varied so that two of the shorter edges of the body are adjacent one another, thereby providing an elongate trivet of different configuration from that shown in FIG. 5.

The embodiment shown in FIG. 6 is the same as has been described except that the body 2 is provided with a plurality of openings 9 corresponding in all respects to that described earlier. By placing two openings 9 adjacent opposite ends of the body more than two such bodies may be coupled in prolongation of one another. By providing another opening 9 adjacent one of the longer edges of the body two bodies may be arranged in such manner that the shorter edge of one body may be placed adjacent a longer edge of another body or in some other arrangement to enable the coupled pads to accommodate irregularly shaped containers.

The disclosed embodiments are representative of presently preferred forms of the invention, but are intended to be illustrative rather than definitive thereof. The invention is defined in the claims.

I claim:

1. A trivet comprising a body formed of thermal insulating material having at least one opening extending therethrough, said opening being defined by a wall having a height corresponding to the thickness of said body at said opening, said opening being encircled by an upstanding reinforcing flange having an internal bore extending in prolongation of said wall, means for coupling said body to another article, said coupling means comprising a first retainer having a stem of such size as to extend through said opening, and an enlargement at opposite ends of said stem, each said enlargement being of such size as to extend beyond said opening and overlie said body adjacent said opening, at least one of said enlargements being sufficiently flexible as to enable said one of said enlargements to be deformed and pass through said opening.

2. A trivet according to claim 1 including a strap joined at one end thereof to said first retainer and being of such length as to extend beyond an edge of said body.

3. A trivet according to claim 2 wherein said strap has an opposite end joined to a second retainer corresponding to said first retainer.

4. A trivet comprising a first body member and a second body member each of which is formed of thermal insulating material having opposite surfaces; and means coupling said first body member and said second body member to one another, said coupling means comprising a flexible strap having opposite ends joined to first and second retainers, each said retainer corresponding in construction and comprising a stem having a length at least as great as the thickness of each said body member, each said stem having at opposite ends thereof an enlargement extending axially and laterally beyond said stem, each said body member having an opening therein of such size as snugly to accommodate one of said stems, each said enlargement being of such size as to extend axially and laterally beyond said opening a distance to overlie an adjacent portion of one of said surfaces of said body member when said stem is within one of said openings, at least one of said enlargements being sufficiently deformable as to enable said one of said enlargements to pass through either of said openings, said strap being of such length as to enable said strap to span said first and second body members when the stem of one of said retainers is accommodated in one of said openings.

5. The trivet according to claim 4 wherein the enlargement at one end of each said stem is formed by a part of said strap.

6. The trivet according to claim 4 wherein each said body member has a plurality of spaced projections of substantially uniform height extending from one surface thereof, thereby enabling a space to exist between said one surface and an article on which said body member is supported.

7. The trivet according to claim 4 including a plurality of spaced projections extending from opposite surfaces of each said body member.

8. The trivet according to claim 4 including a reinforcing flange encircling said opening in each said body member and projecting beyond at least one surface of the associated body member.

9. The trivet according to claim 8 wherein each said opening has a wall and each said flange has a bore, said wall and said bore having substantially the same cross-sectional area.

10. The trivet according to claim 9 wherein said wall and said bore are smooth.

11. The trivet according to claim 4 wherein each said stem is hollow.

12. A trivet comprising a body member formed of thermal insulating material, said body member having a plurality of uniform openings therein spaced from one another, each of said openings extending completely through said body member and being defined by a wall adjacent an edge of said body member, each said opening being encircled by a reinforcing flange projecting beyond at least one surface of said body member, each said flange having a bore corresponding in cross-sectional area to that of each said opening; and coupling means for coupling said body member to another article having an opening therein corresponding in cross-sectional area to that of each said opening, said coupling means comprising a first retainer having a stem of such size as to be accommodated in any selected one of said openings and terminating at one end in an enlargement of such size as to overlie a portion of said body member adjacent said selected one of said openings, said coupling means also comprising a strap having opposite ends one of which is joined to said stem and encircles an opposite end of said stem, said one end of said strap extending beyond said opposite end of said stem a distance beyond that edge of said body member adjacent said selected opening, said strap having at the opposite end thereof a second retainer corresponding to said first retainer.

13. The trivet according to claim 12 including a plurality of spaced apart, substantially uniform height projections extending in the same direction beyond one surface of said body member.

14. The trivet according to claim 12 including a plurality of spaced apart projections extending beyond opposite surfaces of said body member, all of the projections at one side of said body member extending in the same direction.

* * * * *